United States Patent [19]

Winslow et al.

[11] Patent Number: 4,580,112

[45] Date of Patent: Apr. 1, 1986

[54] ACTIVE LINE FILTER FOR POWER LINE CONDUCTED INTERFERENCE

[75] Inventors: Jeffrey K. Winslow, Portland; David F. Baretich, Lake Oswego, both of Oreg.

[73] Assignee: Tektronix, Inc., Beaverton, Oreg.

[21] Appl. No.: 608,056

[22] Filed: May 8, 1984

[51] Int. Cl.[4] .............................................. H04B 3/28
[52] U.S. Cl. ....................................... 333/12; 307/90; 333/181
[58] Field of Search ............. 333/12, 181; 307/296 R, 307/327, 89, 90

[56] References Cited

U.S. PATENT DOCUMENTS

| | | | |
|---|---|---|---|
| 2,931,985 | 4/1960 | Offner | 333/12 X |
| 3,243,684 | 3/1966 | Ekström et al. | 307/89 X |
| 3,513,334 | 5/1970 | Brunner et al. | 307/296 |
| 3,518,577 | 6/1970 | Baum | 333/12 |
| 4,527,261 | 7/1985 | Smither | 333/12 X |

*Primary Examiner*—Paul Gensler
*Attorney, Agent, or Firm*—John P. Dellett; George T. Noe; Robert S. Hulse

[57] ABSTRACT

A line filter for a power supply includes a differential amplifier which is driven from across an inductor in series with a principal current carrying path of the power supply. The differential amplifier output is connected to a capacitance returned to ground for canceling common mode interference as may be generated in the power supply.

10 Claims, 1 Drawing Figure

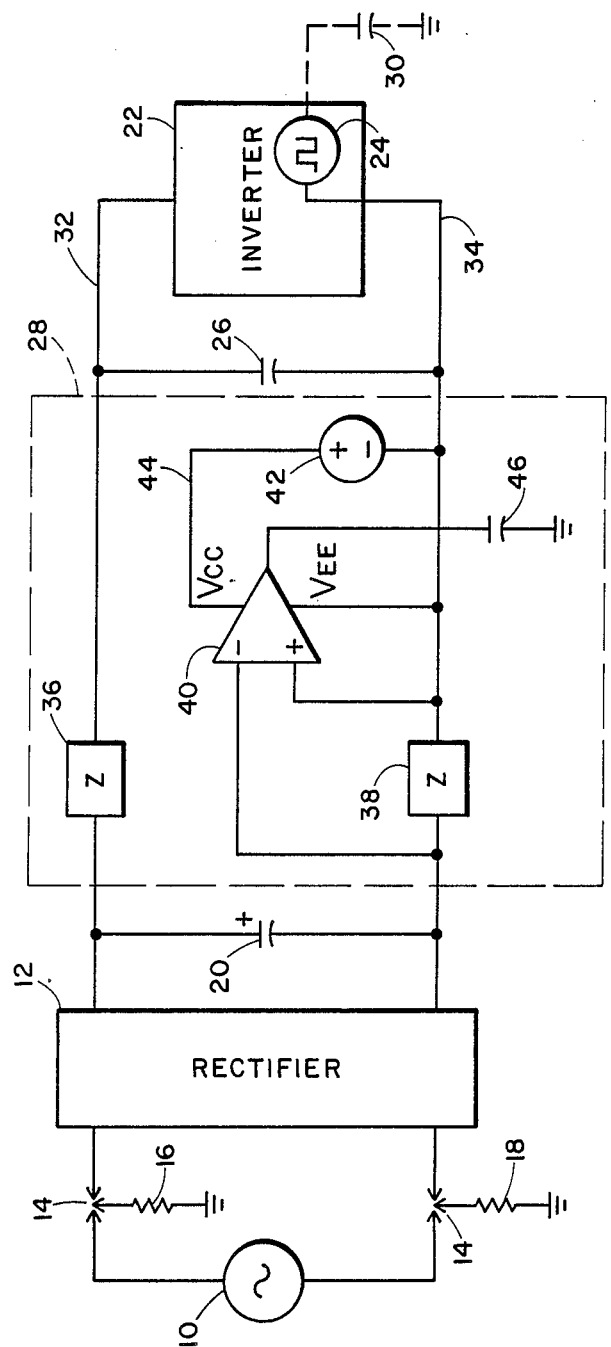

ACTIVE LINE FILTER FOR POWER LINE CONDUCTED INTERFERENCE

BACKGROUND OF THE INVENTION

The present invention relates to power supply circuitry and particularly to power supply circuitry including a line filter for reducing the coupling of power supply generated interference into the power line and other circuits connected thereto.

Electronic power supply circuits may include means, or supply power to means, characterized by the generation of electromagnetic interference. For example, a power supply may drive an inverter for changing a DC voltage to an AC voltage and ultimately to another DC voltage value. Such inverter includes a square-wave generator operating at a rate which causes electromagnetic interference (EMI) at frequencies appreciably higher than the customary 50 or 60 cycle power line frequency. This interference is apt to be coupled directly through the power supply back into the line and to other apparatus connected to the same line.

Some areas of the world have standards which limit the amount of electromagnetic interference that a given device may couple into the power lines, particularly in high frequency ranges. Therefore, line filters are commonly employed in the power supply circuitry for rejecting the coupling of high frequency signals. A common form of such a filter includes series connected inductances in the power supply branches, and shunt connected capacitors disposed either between lines or between a line and ground. Consideration of "ground" or a "point of common reference potential" as a part of the circuit is particularly important in rejecting common mode EMI, i.e. interference that is generated by the offending circuitry with reference to ground. Thus, EMI is typically generated through voltage division of an inverter square-wave across the line impedance and the stray capacitance between ground and the active inverter components. The whole power supply circuit essentially forms one conductor for coupling EMI back into the line with respect to common ground as the other conductor.

The above indicated shunt line filter capacitances between the power supply and ground are helpful in alleviating this problem. Unfortunately, the size of these capacitances is limited by safety requirements and limitations on leakage current at the power line frequency. Thus, excessive leakage current from the power supply to chassis or cabinet ground could impose a hazard to personnel in the event the cabinet itself is not properly connected to earth ground. Since the size of grounding capacitors is limited, reliance on series inductors is emphasized and a line filter composed of a number of series inductances may be required in order to correct the EMI problem. These inductors are not only expensive but also tend to be large and space consuming.

SUMMARY OF THE INVENTION

In accordance with the present invention in a preferred embodiment thereof, a line filter for power line conducted EMI comprises an active element, namely an amplifier, for driving a line filter capacitance returned to ground in phase relation for substantially canceling the EMI generated by an inverter or other circuitry. In a particular embodiment, the amplifier comprises a differential amplifier having a pair of input terminals connected across a series connected line filter impedance (suitably an inductance) which presents a high impedance to EMI but a low impedance at line frequency. Thus, leakage current is not multiplied significantly, although the detected EMI current is significantly multiplied and shunted to ground "inside" the power supply before it reaches the power lines. The net effect is that the line filter behaves as if a much larger capacitor were connected from the power supply to ground than would be permitted by safety considerations if an actual capacitor were to be employed. Consequently, the inductor or inductors used in the line filter can be smaller and relatively inexpensive.

It is therefore an object of the present invention to provide an improved line filter for electromagnetic interference.

It is another object of the present invention to provide an improved line filter for electromagnetic interference which is effective in substantially eliminating the interference while complying with safety considerations relative to leakage current at line frequency.

It is a further object of the present invention to provide an improved line filter for a power supply which is effective in operation and economical in construction.

The subject matter of the present invention is particularly pointed out and distinctly claimed in the concluding portion of this specification. However, both the organization and method of operation, together with further advantages and objects thereof, may best be understood by reference to the following description taken in connection with accompanying drawing wherein like reference characters refer to like elements.

DRAWING

The single drawing is a schematic diagram of a power supply circuit employing an active line filter in accordance with the present invention.

DETAILED DESCRIPTION

Referring to the drawing, illustrating a power supply circuit incorporating the active line filter according to the present invention in a particular embodiment thereof, power lines represented by AC source 10 are connected to rectifier circuit 12 through interconnecting terminals 14. Resistors 16 and 18 represent another load connected to the same power lines including, for example, an EMI test set. Each of the resistors 16 and 18 are returned to ground.

The output of rectifier circuit 12 charges storage capacitor 20 across a load which in this case comprises an inverter 22 including a square-wave generator 24. A bypass capacitor 26 is connected across the inverter input terminals.

A line filter 28 is positioned between the output of rectifier 12 and the input of inverter 22. The purpose of this line filter is to prevent or reduce the coupling of EMI from the inverter 22 back to the lines 10. The EMI is typically generated through voltage division of the square-wave from the inverter across the line impedance and the stray or parasitic capacitance 30 between ground and the active inverter components. Thus, a common mode interference signal is coupled through both lines 32 and 34 back to the power lines, and from the lines to the load represented by resistors 16, 18 having ground returns. The circuit is completed through capacitance 30 back to inverter 22.

The line filter includes series impedances 36 and 38, suitably comprising inductances which may be wound together on the same core for reducing the size of the core required. Impedance 36 is connected in series with line 32 to the inverter and impedance 38 is connected in series with line 34 to the inverter.

According to the present invention, differential voltage amplifier 40 has its input terminals connected across impedance 38, specifically with the inverting input of the amplifier connected to the rectifier side of impedance 38 and the non-inverting input connected to the load side of impedance 38. The amplifier 40 is referenced to line 34 and is provided with a power source 42 also referenced to line 34. The power source may be implemented in any convenient manner, for example by the series combination of a resistor and a zener diode disposed between lines 32 and 34 with the zener diode connected to line 34. In such instance, amplifier terminal 44 would be connected to the junction between the resistor and the zener diode. The amplifier suitably has a gain of between ten and thirty.

The output of amplifier 40 drives a capacitor 46 which returns the interference to ground "inside" the instrument receiving power from the rectifier, thereby preventing the coupling of the interference to lines 10. The effect is similar to connecting a much larger capacitance between line 34 and ground inasmuch as the actual value of the capacitance of capacitor 46 is multiplied by the gain of amplifier 40. The amplifier may be alternatively viewed as driving the common ground terminal with a signal which cancels the interference signal provided through capacitor 30 to ground and in proper phase relation (180 degree phase relation) to accomplish canceling. The output of the amplifier is arranged as described such that it drives ground or the point of common reference potential with respect to line 34 to which the amplifier's output return is connected, thereby completing its output circuit. Inasmuch as the effect of capacitance 46 is greatly enhanced, the inductors employed for impedances 38 and 36 can be smaller (e.g. having less inductance) and less expensive than impedances of the type usually required in filters without amplification.

Although the circuit according to the present invention is effective in substantially eliminating EMI coupling into the line and into other line-powered circuits or instruments by amplifying common mode interference, nevertheless the leakage current at the line frequency (such as 50 or 60 cycles) is not multiplied significantly. The frequency of the EMI is considerably higher than line frequency and the impedance of elements 36 and 38 is designed to be much greater at EMI frequencies than at the line frequency. The leakage current is not multiplied to a great extent because the line frequency voltage across impedances 36 and 38 is infinitesimal as compared with the EMI voltage as provided to the input of the amplifier. This is due not only to the design impedance of elements 36 and 38 but also because the line drives a high impedance (capacitor 46 and capacitor 30) through elements 36 and 38, while the EMI voltage at 34 drives a low impedance (either the line or the load represented by resistances 16 and 18) through elements 36 and 38.

Although the amplifier 40 in the illustrated embodiment is driven from the EMI voltage across impedance 38 and the output return of the amplifier is to line 34, it will be appreciated substantially the same circuit could be employed with its input derived across element 36 and is output return connected to line 32. Of course, a circuit may be connected in both places if so desired. However, with the amplification provided, a circuit in one branch is sufficient.

The line filter in the present embodiment is illustrated as disposed between rectifier 12 and inverter 22, the inverter exemplifying a common-mode EMI generating load. In many instances, however, the line filter may be lineward of the rectifier and the same circuit as herein described may be employed. Indeed, the rectifier circuit including regulating circuitry may constitute the EMI generator. In such case, the amplifier's own power source 42 would suitably be provided with a rectifier for converting AC to DC to operate the amplifier, assuming power was provided from across the lines.

While a preferred embodiment of the present invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

We claim:

1. In a power supply adapted for connection to a line in order to provide power to a load via means having the characteristic of generating interference signals at frequencies higher than the frequency of said line, a filter circuit comprising:
   means for sensing said interference signals including an amplifier responsive at its input to interference current flowing in a principal current carrying path of said power supply,
   and means driven by said amplifier for coupling amplified interference signals to a return path for said interference signals.

2. In a power supply adapted to receive power from a power line, a filter circuit for inhibiting the coupling of interference by said power supply into said power line, said filter circuit comprising:
   means for detecting said interference as an electromagnetic interference current flowing in a principal current carrying path of said power supply,
   amplifier means receiving an input signal from said detecting means and providing an output proportional to said interference,
   and means for coupling said output relative to a point of common reference potential in a phase direction for canceling the interference coupled toward said power line.

3. The apparatus according to claim 2 wherein said means for detecting said interference comprises an impedance serially disposed in a principal current carrying path of said filter circuit, said impedance exhibiting a greater electrical impedance at frequencies of electromagnetic interference than at line frequencies.

4. The method of reducing the coupling of interference signals from a power supply into the power line to which the power supply is connected, comprising:
   detecting common mode interference signals in said power supply by detecting electromagnetic interference current flowing in a principal current carrying path of said power supply,
   amplifying said detected interference signals,
   and coupling said amplified interference signals relative to a point of common reference potential in a phase sense for canceling the coupling of interference signals to said power line.

5. In a power supply for connection to a power line and adapted to provide a desired source of power, including circuitry characterized by production of interference susceptible of being coupled into the said line, a filter for reducing the coupling of said interference comprising:

an impedance connected in series with a principal current carrying path of said power supply, a differential voltage amplifier having a pair of input terminals connected across said impedance, and a second impedance returned to a point of common reference potential and driven by said differential amplifier in phase relation for canceling said interference.

6. The circuit according to claim 3 wherein said second impedance comprises a capacitor.

7. The circuit according to claim 3 wherein the first mentioned impedance comprises an inductance.

8. The circuit according to claim 7 wherein said inductance has substantially higher impedance at the frequency of said interference than at the frequency of current supplied via said power line.

9. The circuit according to claim 5 wherein said amplifier is characterized by substantial gain.

10. The circuit according to claim 5 where the said amplifier's output is referenced to said principal current carrying path of said power supply.

* * * * *